Sept. 19, 1950 W. RICHARDSON 2,523,237
TORCH GUIDING TOOL
Filed Aug. 9, 1947
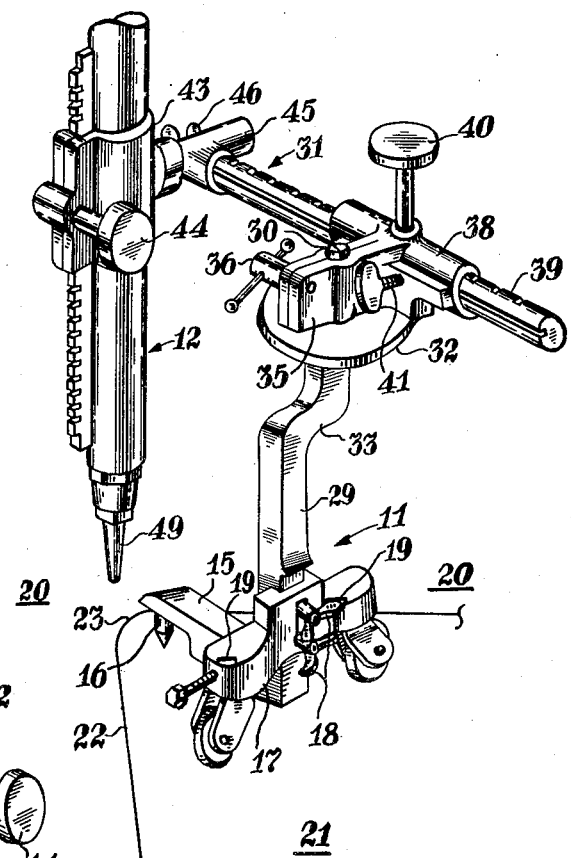
INVENTOR.
WILLIE RICHARDSON
BY Joseph F. O'Brien
ATTORNEY Patented Sept. 19, 1950

2,523,237

UNITED STATES PATENT OFFICE 2,523,237

TORCH-GUIDING TOOL

Willie Richardson, New York, N. Y., assignor of one-half to Alfred Weisstein and Samuel Weisstein, New York, N. Y.

Application August 9, 1947, Serial No. 767,830

1 Claim. (Cl. 266—23)

This invention relates to tools or jigs for cutting border contours of sheet, plate or like material and particularly for cutting metal sheets or plates.

In cutting sheet metal or plate to a curved-border contour, it is difficult so to control the cut as to cause the same to follow the desired path, and at the same time to produce a cut with the desired angle for welding. This is especially true in making a cut having a small-radius curvature, or in cutting a sharply-rounded corner continuous with a straight-line edge.

My invention eliminates the difficulties heretofore encountered in the prior art and comprises a novel tool or jig adapted for the cutting, and preferably for the flame-cutting, of rounded corners and for cutting either inside or outside corners of varying radii. The tool or jig of this invention is particularly useful for cutting sharply-rounded or small-radii corners, and enables a small radius curvature to be cut more accurately and more quickly than under prior art practice. The preferred form of my invention is adapted for flame cutting and accordingly embodies a cutting torch.

In accordance with the present invention, the tool or jig comprises a carriage adapted to rest on the surface of the work piece, and to be moved along the surface of the piece in a predetermined path which is controlled by suitable guiding means. The carriage supports a cutter, for example, by means of a suitable fixture which is operable to adjust the position of the cutter on the carriage to control the height of the cutter from the surface of the work piece. Adjustment of the cutter enables accurate horizontal traverse as well as vertical traverse, and enables the cutter to be located with reference to a predetermined point on the surface of the piece, the point being in a line that is scribed to indicate where the piece is to be cut. The adjustment also is employed to dispose the cutter at a predetermined angle with reference to the surface of the piece.

When the cutter is adjusted on the carriage to position it for making the desired cut along the scribed line, the guiding means operates to control movement of the carriage to cause the cutter to follow the scribed line. Pursuant to the desired cut being a rounded corner, the guiding means controls movement of the carriage along a circular path, the cutter being adjusted on the carriage to be located a predetermined distance from the center of the circle. The cutter makes an arcuate cut, the radius of which is determined by the distance of the cutter from the center of rotation of the carriage.

With these and other objects in view, the invention comprises the combination of members and arrangement of parts so combined as to coact and cooperate with each other in the performance of the functions and the accomplishment of the results herein contemplated, and comprises in one of its adaptations the species or preferred form illustrated in the accompanying drawings, in which:

Fig. 1 is a perspective view of a tool embodying the invention, and

Fig. 2 is a perspective view of another embodiment of the invention.

The jig or tool of the present invention constitutes a carriage, illustrated generally at 11 of Fig. 1, which supports a cutter indicated generally at 12, the specific cutter of the disclosed embodiment being a flame cutter.

The tool of the present invention is adapted to cut sheet or plate, such as the work piece 20, 21 of Fig. 1. Usual practice is to scribe the work piece, for example, with the line 22, which indicates to the operator where the cut is to be made. The tool of the present invention is employed particularly for cutting the arc of the rounded corner 23, which may be either an inside-round or an outside-round, depending upon whether the portion of the piece 20 or 21, on opposite sides of the scribed line 22, is desired for the piece part being fabricated. Whichever piece 20 or 21 is desired for the piece part, the other piece is considered scrap, but a piece of scrap may be used as a work piece to fabricate another piece part for which it is suitable.

The carriage 11 comprises the radius arm 15, with the downwardly directed center point 16 at one end thereof. A rest 17 is attached to the other end of the radius arm 15 projecting downwardly therefrom to engage the piece, attachment of the rest 17 to the radius arm 15 being by any suitable means. In the embodiment of Fig. 1, the rest member 17 is attached for vertical adjustment in any conventional manner, and, as shown, said rest member is provided at its middle portion with a vertically disposed groove while the lower end of the post 29 has a terminal portion fitting and slidably-movable within said vertically disposed groove and projecting upwardly from said rest member at a right angle, said rest member also being provided with a slot communicating with said groove and extending to the opposite vertical face of said rest arm to enable fastening of said terminal portion to said rest member. In the preferred embodiment, conventional wing bolts 18 have screw portions passing through said slot and inserted in said terminal portion while nut portions thereof engage the edges of said slot. Obviously, the use of a pair of such wing bolts in connection with a series of aligned holes will permit vertical adjustment of the post 29 in relation to the rest arm 17. The rest 17 and the center point 16 provide three-point suspension, and the rest 17 accordingly comprises the arms 19 which extend transversely of the radius of the radius arm 15. The work-surface-engaging members of the rest project downwardly from the ends of their respective arms into abutting relationship with the surface of the piece 20, 21.

In the preferred embodiment shown, the rollers 25 are provided to constitute the surface-engaging members of the arms 19, there being one roller 25 for each arm 19. Each roller 25 is mounted to swing with reference to its arm 19, to position its axis for it to roll in a predetermined desired direction along the surface of the work piece 20, 21. When the tool is made ready for use, the rollers 25 are swung to roll in a direction transversely of the radius arm 15, and are held positioned to roll in the desired direction by the set screws 26.

Projecting upwardly from the radius arm 15, at the end thereof opposite the center point 16, is the tool-supporting post 29, at the terminus of which is the pin 30 to which the cutter fixture, illustrated generally at 31, is attached. Between the pin 30 and the radius arm 15 the post 29 is offset laterally at 33, the offset 33 serving to locate the cutter 12 in line with the radius arm 15 when the cutter is set for making the cut.

Fixture 31 comprises the clamp 35, and includes the platen 32 which serves as an abutment rest for the clamp 35 positioned on the pin 29. The set screw 36 is provided to attach the clamp 35 in holding engagement with the pin 30.

The clamp 35 comprises the traversing guideway 38 integral therewith, which serves for horizontal traverse of the cutter 12. The traverse bar or rod 39 is movable longitudinally in the guideway 38 by any suitable means such as a traversing gear which is manually operated by the knob 40. The set screw 41 is provided to hold the bar 39 in position of adjustment in the guideway 38 when the horizontal adjustment for positioning the cutter 12 has been made.

The cutter 12 can be traversed vertically in the traverse guideway 43 by any suitable means such as a traverse gear which is manually operated by rotating the knob 44. The traverse guideway 43 is mounted to rotate in the sleeve 45, which is attached to the end of the horizontal traverse rod 39. This enables adjustment of the cutter 12 to direct the cut to be made disposed at any desired angle with reference to the surface of the work piece 20, 21. The set screw 46 is provided to hold the cutter 12 in its position of angular adjustment with reference to the surface of the work piece.

The specific type of cutter 12 employed in the disclosed embodiment is a flame cutter or cutting torch, which includes the flame directing nozzle 49 by means of which a cutting flame is disposed in the direction in which the nozzle 49 points. In the tool set-up shown, a straight nozzle is employed. It will be understood by persons skilled in the art that other nozzles can be used; for example, an angularly disposed nozzle such as is illustrated at 50 in Fig. 2 can be substituted for the nozzle 49 of Fig. 1.

When it is desired to cut a work piece 20, 21 for example a sheet metal member, the tool of the embodiment of Fig. 1 is employed for cutting corners which are rounded. Usual practice is to scribe the piece to indicate the line along which the piece is to be cut, for example along the line 22 which includes the rounded corner 23. The center point 16 is positioned to rest in the center hole which was punched to scribe the corner 23. A suitable nozzle 49 is applied to the cutter 12. The fixture 31 is now placed on the post 29 with the torch 12 placed to point the nozzle 49 towards the line lengthwise of the radius arm 15 through the center point 16, the clamp 35 then being fixed to the pin 30 by manual rotation of the set screw 36. Now the tool is traversed horizontally by manual operation of the traversing knob 40 until the nozzle 49 points to the arc of the corner 23. The tool is also traversed vertically by manual operation of the knob 44 to position the nozzle 49 the desired height above the surface of the work piece 20, 21. The tool is now moved along the surface of the work piece 20, 21, by rotating the carriage 11 around the center of the point 16. The flame of the cutting torch 12 operates to cut the work piece along the arcuate line coincident with the scribed corner 23, the cut being disposed at an angle to the surface of piece 20, 21, which is predetermined by the direction in which the nozzle 49 points.

The tool of the embodiment of Fig. 1 will cut inside or outside radii, depending upon which portion of the work piece, inside or outside the scribed line 22, is desired for the piece part. It is preferred practice, however, to rest the weight of the tool on the piece part. Accordingly, limitations in the size of the work piece, and the available area of scrap may impair the use of the tool of Fig. 1 for cutting inside-rounds. The tool of the embodiment of Fig. 2 is sometimes preferred when it is desired to cut an inside radius.

The tool of Fig. 2 provides a carriage 52 comprising the radius arm 53, with the center point 54 projecting downwardly from one end thereof. The rest 55, at the other end of radius arm 53, is in the form of a cradle of which the radius arm 53 rests in the manner shown, any suitable means being provided to fasten the radius arm to the rest 55. The rest 55 comprises the arms 57 extending transversely of the radius of the radius arm 53, each arm 57 being provided with a roller 58 similar to the rollers 25 of Fig. 1. The rollers 58 are held in adjusted position for rolling in the desired direction by means of the set screws 59.

The post 61 projects upwardly from the radius arm 53 at its end opposite the center pin 54, the post 61 being offset at 62 in the manner of the offset 33 of Fig. 1, and for a like purpose. The upper terminus of the post 61 comprises the pin 63 to which the cutter 12 is attached by means of a fixture 31.

The fixture 31 of Fig. 2 comprises the same structure as the fixture 31 of Fig. 1, and it comprises the clamp 35 which is bound to the pin 63 by means of the set screw 36. The traversing guideway 38 is integral with the clamp 35, and carries the traversing bar 39 movable longitudinally therein by means of the knob 40. The cutter 12 is traversed vertically in the guideway 43, by means of knob 44, the guideway 43 being held by the set screw 46 in the sleeve 45, which is attached to the end of the traverse rod 39.

The cutter 12 has the nozzle 50 attached to it, and in the embodiment shown in Fig. 2, the nozzle 50 is attached to the cutter 12 through the adaptor 65 which is angularly disposed to direct the nozzle 50 in a line at an angle with reference to the surface of the work piece.

The work piece of Fig. 2 comprises the piece-part portion 67 and the scrap portion 68, the line 69 being scribed on the surface of the work piece to indicate where the piece is to be cut. The line 69 including the arcuate portion 70 of an inside corner which is to be cut by the tool of the invention.

It will be noted that the rollers 58 of the embodiment of Fig. 2 rest on the surface of the piece-part 67 being fabricated. The center of the arc 70, into which the center point 54 is positioned, is located on the scrap portion 68 of the work piece, and the radius arm 53 straddles the scribed line 69. This locates the cutter along the radius of the radius arm 53. Accordingly, the radius arm 53 is offset on both sides of its radius to comprise the spaced apart legs 72, the offset being sufficient to provide clearance for the tool 12 which is located in the radius of the radius arm 53.

The tools illustrated in the drawings are practical embodiments of the invention, which can be modified without departing from the spirit of the invention. The scope of the invention is determined by the accompanying claim.

What is claimed is:

A torch-guiding tool for cutting border contours of sheet, plate or like material embodying, in combination, a carriage having three surface-contacting supporting members positioned in triangular relationship and supported to move on a supporting surface in a plane closely adjacent to said supporting surface, said carriage comprising a rest member and a radius arm mounted in and connected with said rest member to project horizontally therefrom at substantially a right angle, said rest member being mounted on a pair of surface-engaging supporting rollers each mounted on a vertical axis, projecting downwardly into engagement with the supporting surface and being movable in a horizontal plane about said vertical axis to assume varying angular positions relatively to said rest arm, adjustable means for retaining said rollers in one of such angular positions to form two of said supporting members and said radius arm having at the outer end thereof a fixed center-point member also projecting downwardly into engagement with the supporting surface to function as the third supporting member, a cutter-supporting post extending upwardly at the connection between said radius arm and said rest member to a plane substantially above said carrier, a cutter fixture mounted on said post, a horizontally-movable traverse bar mounted in said cutter fixture, and means on said traverse bar for mounting said flame cutter and for adjusting the position thereof in relation to said fixed center point member.

WILLIE RICHARDSON.

REFERENCES CITED

The following references are of record in the file of this patent:

UNITED STATES PATENTS

| Number | Name | Date |
| --- | --- | --- |
| 1,317,425 | Bryce | Sept. 30, 1919 |
| 1,320,687 | Harris | Nov. 4, 1919 |
| 1,351,846 | Forster | Sept. 7, 1920 |
| 1,553,508 | Cloud | Sept. 15, 1925 |
| 1,915,915 | Anderson | June 27, 1933 |
| 2,170,305 | Ingwersen | Aug. 20, 1939 |
| 2,202,133 | Young | May 28, 1940 |
| 2,283,347 | Young | May 19, 1942 |
| 2,311,223 | Geibig | Feb. 16, 1943 |
| 2,403,514 | Franzen | July 9, 1946 |